United States Patent [19]

Buriks et al.

[11] Patent Number: 4,582,628

[45] Date of Patent: Apr. 15, 1986

[54] VINYL-TYPE INTERPOLYMERS AND USES THEREOF

[75] Inventors: Rudolf S. Buriks, St. Louis, Mo.; James G. Dolan, Granite City, Ill.

[73] Assignee: Petrolite Corporation, St. Louis, Mo.

[21] Appl. No.: 736,876

[22] Filed: May 23, 1985

Related U.S. Application Data

[60] Continuation of Ser. No. 527,069, Aug. 29, 1983, abandoned, which is a division of Ser. No. 435,859, Oct. 21, 1982, abandoned, which is a continuation-in-part of Ser. No. 55,661, Jul. 9, 1979, abandoned.

[51] Int. Cl.$^4$ ............................................. B01D 17/04
[52] U.S. Cl. ................................... 252/340; 252/342; 523/335; 523/336; 523/337; 523/339
[58] Field of Search ................ 252/340, 342; 523/130, 523/131, 335, 336, 337, 339

[56] References Cited

U.S. PATENT DOCUMENTS

| | | | |
|---|---|---|---|
| 2,078,655 | 4/1937 | De Groote | 252/342 |
| 2,430,564 | 11/1947 | Gordon | 526/321 |
| 2,599,538 | 6/1952 | Blair | 252/340 |
| 2,600,450 | 6/1952 | Van Horne et al. | 526/329.5 |
| 2,600,451 | 6/1952 | Van Horne et al. | 526/329.5 |
| 2,626,909 | 1/1953 | De Groote | 252/342 |
| 2,800,453 | 7/1957 | Bondi et al. | 526/331 |
| 3,268,357 | 8/1966 | Hart et al. | 526/329.5 |
| 3,310,513 | 3/1967 | Barie et al. | 526/329.5 |
| 3,440,060 | 4/1969 | Rife et al. | 526/330 |
| 3,442,844 | 5/1969 | Bouchard et al. | 526/321 |
| 3,519,587 | 7/1970 | Wiest et al. | 526/330 |
| 3,668,165 | 6/1972 | Bergmeister et al. | 526/330 |
| 3,755,237 | 8/1973 | Isaacs et al. | 526/331 |
| 3,857,806 | 12/1974 | Isaacs et al. | 526/331 |
| 4,219,454 | 8/1980 | Iacoviello et al. | 526/329.5 |

Primary Examiner—Harry Wong, Jr.
Attorney, Agent, or Firm—Robert E. Wexler

[57] ABSTRACT

This invention relates to vinyl-type interpolymers having an overall carbon/oxygen atom ratio of about 2 to about 4, which is preferably derived from 2 types of vinyl monomers:

(1) at least one vinyl-type monomer present in the interpolymer at about 50 mole % or greater and having a carbon/oxygen atom ratio of about 3 or less ("hydrophilic" monomer), and (2) at least one vinyl-type monomer present in the interpolymer at about 50 mole % or less and having a carbon/oxygen atom ratio of about 3 or more ("hydrophobic" monomer).

Typical examples are vinyl acetate/vinyl fatty ester copolymers and vinyl acetate/dialkyl maleate copolymers. This invention also relates to uses for these compositions, particularly in the demulsification of W/O emulsions.

27 Claims, No Drawings

VINYL-TYPE INTERPOLYMERS AND USES THEREOF

This is a continuation of application Ser. No. 527,069, filed Aug. 29, 1983, now abandoned, which is a division of Ser. No. 435,859, filed Oct. 21, 1982, now abandoned, which is a continuation-in-part of U.S. patent application Ser. No. 055,661 filed July 9, 1979, now abandoned.

This invention relates to unique novel demulsifying agents useful in preventing breaking or resolving emulsions of the water-in-oil type and particularly petroleum emulsions. Their use provides an economical and rapid process for resolving petroleum emulsions of the water-in-oil type that are commonly referred to as "cut oil," "roily oil," "emulsified oil," etc. and which comprises fine droplets of naturally-occurring waters or brines dispersed in a more or less permanent state throughout the oil which constitutes the continuous phase of the emulsion.

These novel demulsifying agents also provide an economical and rapid process for breaking and separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil, (i.e., desalting).

Demulsification as contemplated herein includes the preventive step of commingling the demulsifier with the hydrocarbon phase. Similarly, such demulsifiers may be mixed, emulsified, suspended, etc. in the aqueous component.

Heretofore, a wide variety of chemical agents have been employed in the demulsification of such W/O emulsions. Most of the demulsifiers currently in commercial use are oxyalkylated chemical agents.

We have now discovered a new class of agents which are effective in the demulsification of W/O emulsions, particularly petroleum W/O emulsions.

These novel demulsifiers are in general water insoluble, oil soluble, vinyl-type interpolymers derived from one or more hydrophilic vinyl-type monomers and one or more hydrophobic vinyl-type monomers. Any pair or combination of vinyl-type monomers can be used to prepare these interpolymers provided the following three requirements are met:

(1) At least one monomer (referred to as the "hydrophilic" monomer) containing, aside from the vinyl function, only aliphatic carbon atoms and oxygen atoms in such a fashion that the overall carbon atom to oxygen atom ratio in the monomer is about 3.0 or less. (e.g., vinyl acetate, vinyl formate, methyl acrylate, dimethyl maleate, ethyl methacrylate, methyl vinylether, etc.)

(2) At least one monomer (referred to as the "hydrophobic" monomer) containing, aside from the vinyl function, only aliphatic carbon atoms or aliphatic carbon atoms and oxygen atoms in such a fashion that the overall carbon atom to oxygen atom ratio in the monomer is about 3.0 or more (e.g., vinyl stearate, dodecyl acrylate, butyl methacrylate, dioctyl maleate, 1-octene, 1-dodecene, dodecyl vinyl ether, etc.).

(3) The interpolymers are derived from at least 50 mole % of "hydrophilic" monomer and 50 mole % or less of "hydrophobic" monomer in such a manner that the overall carbon atom to oxygen atom ratio of the interpolymer is between about 2 and about 4. The hydrophilic to hydrophobic mole percent ratios of the monomers can vary widely, such as from about 50/50 to about 95/5, for example from about 75/25 to about 90/10 with an optimum of about 80/20 to 90/10. However, the optimum ratio employed will, of course, depend on the particular monomers employed. They preferably have a random composition and a relatively low molecular weight.

The interpolymers of this invention can be viewed as substituted polyethylenes of the following generalized structure:

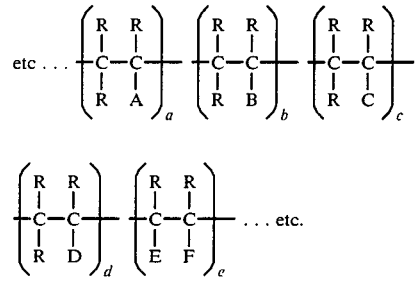

in which A, B, C, D, E, F, etc. may be the same or different functional groups chosen from among:

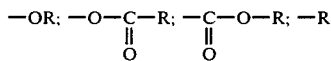

in which R designates $-C_nH_{2n+1}$ with n being a whole number, e.g., 0, 1, 2, 3, 4, etc. and wherein a, b, c, d, e, etc. indicate numbers of units of any particular kind, as specified above, incorporated into the random interpolymer.

As an indication of the variety of types of interpolymers fitting the above general description, some non-limiting examples of such interpolymers are methyl acrylate/octadecene copolymers, vinyl acetate/distearyl maleate interpolymers, methyl vinylether/dodecyl vinylether copolymers, vinyl acetate/vinyl decanoate copolymers, etc. In this invention these interpolymers are sometimes exemplified by vinyl acetate/vinyl fatty ester copolymers.

They are essentially water insoluble, oil soluble interpolymers at room temperature. This indicates that these interpolymers are only soluble to the extent of less than about 0.1% by weight in water and essentially solvent soluble in aromatic type solvents, for example having solubilities of at least about 1% by weight, but preferably at least about 5% in an aromatic solvent. These solubilities may be in an aromatic hydrocarbon solvent alone (toluene, xylene, etc.) or in conjunction with other solvents, for example, lower alkanols (1–50% alkanol in aromatic solvent) such as methanol, propanol, butanol, etc.

The specific demulsification agents of this invention are essentially water insoluble, oil soluble interpolymers produced by free radical initiated interpolymerization of at least one "hydrophilic" monomer, e.g. vinyl acetate, and at least one "hydrophobic" monomer, e.g. a vinyl ester. Vinyl acetate (the "hydrophilic" vinyl ester; C/O=2.0, soluble to the extent of 1% or more in water) must constitute at least about 50 mole % of the interpolymer. The "hydrophobic" monomer, e.g. vinylester(s) constituting the remaining less than about 50 mole % of the interpolymer, can in general be any hydrophobic monomer, e.g. vinyl ester $CpH_{2p-2}O_2$, provided p represents a number equal to or greater than 6 (to meet the required C/O ratio of 3 or higher). Examples of "hydrophobic" monomers according to this definition are:

vinyl hexanoate
vinyl octanoate
vinyl decanoate
vinyl laurate
vinyl stearate
di(stearyl) maleate
vinyl palmitate, etc.

Methods for the preparation of interpolymers based on combinations of vinyl esters by free radical polymerization are well known to the art. For our purpose any suitable method that will result in the formation of such interpolymers can be used, provided that the resulting interpolymer has the "desired composition" and a relatively low molecular weight ($\leq 200,000$). Solutions containing from 25–50% of such materials are generally fluid and easy to handle.

Although all compositions within this range exhibit at least some slight demulsifier activity, it should be understood that specific ones among these show much higher activity than others. In general, the more active materials are usually found in interpolymers based upon monomer combinations between "hydrophilic" monomers with low C/O ratios (like vinyl acetate, methylacrylate, etc.) and "hydrophobic" monomers with high C/O ratios (like vinyl stearate, dioctyl maleate, etc.), rather than in interpolymers based on monomer pairs, both with C/O ratios close to 3.0. Those familiar with the art and the general surfactant theory may appreciate this observation in the general context of the HLB principle.

As stated in the introduction, only those interpolymers are considered to have "the desired composition" in which the overall carbon to oxygen ratio falls in the specified range from about 2 to about 4.

A substantial number of vinyl ester interpolymers were prepared. As stated before, general methods for the preparation of vinyl ester interpolymers by free radical polymerization are well known to the art. With few exceptions all interpolymers of the present invention were prepared according to the following general procedure: To a pressure reactor, 64 parts of the desired molar combination of monomers is charged, followed by 96 parts of solvent (aromatic, e.g., benzene, toluene, xylene, etc.) and initiator (2,2'-azobis(-methylpropionitrile), "VAZO"), 1–3% of the total monomer weight, to give a 40 percent active monomer solution. Before sealing the reactor, its content is purged with nitrogen for 15 minutes. Upon completion of the oxygen removal the reactor is sealed and heated to 65° C. The reaction is maintained at this temperature for 16–24 hours. A small part of the reaction product is then stripped in vacuo to determine conversion of monomers to polymer and to obtain a sample for further analyses. The bulk of the sample is kept as such.

Normally the polymer solutions obtained from this procedure were moderately viscous, nicely fluid products with a polymer content of 35–40%. To those familiar with the art of vinyl interpolymerization and the concept of interpolymerization parameters, it will be clear that, even though all monomers are vinyl esters, the desired random interpolymer composition could not in all cases directly be customized by choosing that same ratio in the monomer mixture. It sometimes became necessary to devise a special monomer addition scheme to prepare an interpolymer with the desired composition. In other instances fractionation of polymer batches resulted in samples with a well defined much narrow monomer ratio.

Special emphasis was placed on the synthesis of the commercially most attractive interpolymers, namely those copolymers based on vinyl acetate (as the "hydrophilic" monomer) and vinyl-tertiary decanoate ("Versatic-10" monomer Shell) (as the "hydrophobic" monomer). Altogether several hundred interpolymers were prepared and subsequently evaluated for demulsification activity.

These interpolymers were evaluated by the method generally referred to as the "Bottle Test" described in "Treating Oil Field Emulsions" second edition, issued by Petroleum Extension Service and the Texas Education Agency in cooperation with the American Petroleum Institute, 1955, (revised 1962) pages 39–44. These evaluations were carried out at wells at various locations as listed below in the following States:

TABLE I

| Field | State |
|---|---|
| Dixie Pool | Oklahoma |
| Oregon Basin | Wyoming |
| Weyburn | Canada |
| Brookhaven | Mississippi |
| Manvel | Texas |
| Thompson | Texas |
| Pine | Montana |
| Crawar | Oklahoma |
| Fort Zarah | Kansas |
| Richfield | California |
| Weeks Island | Louisiana |
| Elk Basin | Wyoming |
| Huntington Beach | California |
| Port Barre | Louisiana |
| Fruitvale | California |

It should be understood that specific responses by a particular crude to a specific composition, as determined by this bottle test will vary widely due to the great variety in the nature, composition, character, production method, temperature, etc., etc. of the crude oil in question and the specific interpolymer under evaluation. In order to establish a reliable method to evaluate the relative performance of these vinyl ester interpolymers compared to the activity of commercially available demulsifying agents, as used at different locations, an average overall performance rating was devised as follows:

| | |
|---|---|
| no, or very little, activity | 0 |
| little activity | p (poor) |
| substantial activity | f (fair) } indicating good, commercially significant activity. |
| excellent activity | g (good) |

In this rating scheme the field standard, the commercial material actually in use at the particular location is given a g rating, while all experimental materials are judged relatively to this standard.

The following Table II describes a cross section of vinyl ester copolymers prepared and evaluated during the course of this invention, (the following abbreviations were used:)

VA=vinyl acetate
VV-10=vinyl ester of "Versatic-10" (Shell trade name) acid:

$$R_1R_2R_3C-CO_2-CH=CH_2$$

$$R_1+R_2+R_3=C_8H_{18}-$$

ViBut = vinyl isobutyrate
V-n-Dec = Vinyl normal decanoate
V-Stear = Vinyl stearate
VF = Vinylformate
VP = Vinyl propionate.

TABLE II

| Example No. | Copolymer | Mole Ratio | C/O Ratio | Average Performance Rating | Remarks |
|---|---|---|---|---|---|
| 1 | VA/VV10 | 100/0 | 2.0 | 0 | As made |
| 2 | " | 90/10 | 2.4 | p | " |
| 3 | " | 80/20 | 2.8 | f | " |
| 4 | " | 70/30 | 3.2 | g | " |
| 5 | " | 60/40 | 3.6 | f | " |
| 6 | " | 50/50 | 4.0 | p | " |
| 7 | " | 40/60 | 4.4 | 0 | " |
| 8 | " | 30/70 | 4.8 | 0 | " |
| 9 | " | 20/80 | 5.2 | 0 | " |
| 10 | " | 10/90 | 5.6 | 0 | " |
| 11 | VA/VV10 | 95.4/4.6 | 2.18 | p | " |
| 12 | " | 92.9/7.1 | 2.28 | p | " |
| 13 | " | 90.2/9.8 | 2.38 | p | " |
| 14 | " | 87.4/12.8 | 2.50 | p | " |
| 15 | " | 84.3/15.7 | 2.63 | f | " |
| 16 | " | 81.1/18.9 | 2.76 | g | " |
| 17 | " | 77.6/22.4 | 2.90 | f | " |
| 18 | VA/VV10 | 87/13 | 2.52 | p | " |
| 19 | " | 88.6/13.4 | 2.54 | p | Fractionated From Ex. 3 above* |
| 20 | " | 85.5/14.5 | 2.58 | f | Fractionated From Ex. 3 above* |
| 21 | " | 83.3/16.7 | 2.67 | f | Fractionated From Ex. 3 above* |
| 22 | " | 80.1/19.9 | 2.80 | g | Fractionated From Ex. 3 above* |
| 23 | " | 78.4/21.6 | 2.86 | g | Fractionated From Ex. 3 above* |
| 24 | " | 74.6/25.4 | 3.02 | f | Fractionated From Ex. 3 above* |
| 25 | " | 73.6/26.4 | 3.06 | f | Fractionated From Ex. 3 above* |
| 26 | VA/ViBut | 80/20 | 2.2 | 0 | As made |
| 27 | " | 60/40 | 2.4 | 0 | " |
| 28 | " | 40/60 | 2.6 | 0 | " |
| 29 | " | 20/80 | 2.8 | p | " |
| 30 | " | 0/100 | 3.0 | p | " |
| 31 | VA/V-n-Dec | 90/10 | 2.4 | 0 | " |
| 32 | VA/V-n-Dec | 85/15 | 2.6 | 0 | " |
| 33 | VA/V-n-Dec | 80/20 | 2.8 | p | " |
| 34 | VA/V-n-Dec | 75/25 | 3.0 | f | " |
| 35 | VA/V-n-Dec | 70/30 | 3.2 | f | " |
| 36 | VA/V-n-Dec | 65/35 | 3.4 | p | " |
| 37 | VA/V-n-Dec | 60/40 | 3.6 | 0 | " |
| 38 | VA/V-Stear | 95/5 | 2.4 | 0 | " |
| 39 | " | 92.5/7.5 | 2.6 | p | " |
| 40 | " | 90/10 | 2.8 | p | " |
| 41 | " | 87.5/12.5 | 3.0 | p | " |
| 42 | " | 85/15 | 3.2 | p | " |
| 43 | " | 82.5/17.5 | 3.4 | p | " |
| 44 | " | 80/20 | 3.6 | 0 | " |
| 45 | VT/VV10 | 77.8/22.2 | 2.5 | 0 | " |
| 46 | " | 72.2/27.8 | 2.75 | p | " |
| 47 | " | 66.4/33.3 | 3.0 | 0 | " |
| 48 | " | 61.1/38.9 | 3.25 | 0 | " |
| 49 | " | 55.6/44.4 | 3.5 | 0 | " |
| 50 | " | 50/50 | 3.75 | 0 | " |
| 51 | VP/V-Stear | 96.7/3.3 | 2.75 | 0 | " |
| 52 | " | 93.3/6.7 | 3.0 | 0 | " |
| 53 | " | 90/10 | 3.25 | 0 | " |
| 54 | " | 86.7/13.3 | 3.5 | 0 | " |
| 55 | " | 83.3/16.7 | 3.75 | 0 | " |
| 56 | " | 80/20 | 4.0 | 0 | " |

*Examples 19 through 25 contain copolymers fractionated from Example 3 of Table II (mole ratio 80/20) to yield the mole ratio shown in the specific examples 19 through 25.

Although specific interpolymers may end up with a low average overall rating (o,p) in the above table, such products may well score high at another particular location, or vice versa, as can be seen from the specific examples that follow.

It is also often observed that specific types of materials perform exceptionally well in one particular phase of the demulsification process, although blending with components contributing complementary activity is required to form a "complete" compound. So these "single component" vinyl ester interpolymers for this reason may score less than the field standards which are always blends of several ingredients.

The following examples of bottle tests are presented for purposes of illustration and not of limitation.

EXAMPLE 57

A crude oil emulsion, produced in the Oregon Basin, Wyo., contained 34% water. The demulsifier to be tested was added, as a 1% solution, to 100 ml of the emulsion. After shaking for 4 minutes (at 200 shakes per minute) the treated emulsion was allowed to quietly settle for two hours. The resultant top oil was then sampled at about half-way total liquid depth and analyzed for water content with the following results (Table III).

TABLE III

| Product of Example: | ml of 1% Soln. | Residual H$_2$O in treated oil |
|---|---|---|
| Commercial blend A | .25 | 1.2% |
| In use at location | .20 | .7% |
| Commercial blend B | .15 | 1.4% |
| In use at location | .20 | 1.0% |
| Example No. 26 | .20 | 4.8% |
| Example No. 27 | .20 | 4.4% |
| Example No. 28 | .20 | 1.2% |
| Example No. 29 | .20 | 0.5% |
| Example No. 30 | .20 | 0.9% |
| Example No. 32 | .20 | 8.8% |
| Example No. 33 | .20 | 3.4% |
| Example No. 34 | .20 | 1.2% |
| Example No. 35 | .20 | 1.2% |
| Example No. 36 | .20 | 5.3% |

EXAMPLE 58

An emulsion sample was taken from the production in the Twining Field in Alberta, Canada. This emulsion contained 50% water. It was treated with a 1% solution of chemical per 100 ml., shaken for 200 shakes and analyzed after a quiet settling period of 45 minutes with the following results (Table IV).

TABLE IV

| Product of Example | ml of 1% soln. | Percent residual $H_2O$ in treated oil |
|---|---|---|
| Commercial compound in use | 1.8 ml. | 0.5% |
| Example 33 | " | 0.6% |
| Example 34 | " | 0.4% |
| Example 35 | " | 0.4% |

EXAMPLE 59

An emulsion, containing 30–35% water was sampled while hot from the Fruitvale Field, Bakersfield, Cal. The sample was heated, 5% solution of chemical was added and shaken hot ($\approx 96°$ C.) for five minutes at 150 shakes per minute. After quietly settling at 96° C. for four hours, the top oil was sampled, close to the interphase, and analyzed for residual water with the following results:

TABLE V

| Product of Example: | ml 5% soln. | % residual water in treated oil |
|---|---|---|
| Standard in use | 5 ml | 1.8% |
| Commercial C | " | .8% |
| Example 46 | " | 12.0% |
| Example 47 | " | 17.0% |
| Example 11 | " | 1.6% |
| Example 12 | " | 1.8% |
| Example 13 | " | .8% |
| Example 14 | " | 1.0% |
| Example 15 | " | .4% |
| Example 16 | " | .2% |
| Example 17 | " | 1.6% |
| Example 56 | " | 34.0% |

A preferred embodiment of this invention pertains to interpolymers of a hydrophilic monomer and a hydrophobic dialkyl maleate monomer, e.g., vinyl acetate/dialkyl maleate interpolymers having an overall C/O atom ratio of between about 2 and about 4 and having about 50 mole % or more hydrophilic monomer and 50 mole % or less dialkyl maleate, e.g. 50–99 mole % vinyl acetate and, correspondingly, 50–1 mole % dialkyl maleate, preferably 65–97 mole % vinyl acetate and, correspondingly, 35–3 mole % dialkyl maleate. Especially useful is a copolymer of about 75–95 mole % vinyl acetate and, correspondingly, about 25–5 mole % dialkyl maleate.

The hydrophobic dialkyl maleate constituting 50 mole % or less of the copolymer can in general be any dialkyl maleate characterized by the general formula:

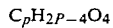

$$C_pH_{2p-4}O_4$$

provided p represents a number equal to or greater than 12 (to meet the required C/O ratio of 3 or higher).

Examples of dialkyl maleate monomers according to the above definition are dibutyl maleate, dihexyl maleate, dioctyl maleate, di-(2-ethylhexyl) maleate, di-dodecyl maleate, di-octadecyl maleate, ethylhexyl maleate, octadecyl maleate, mixed dialkyl maleates and the like.

A substantial number of dialkyl maleate-containing interpolymers were prepared. General methods for the preparation of copolymers of hydrophilic esters like vinyl acetate with hydrophobic maleate esters by free radical polymerization are known. The dialkyl maleate-containing interpolymers were prepared according to the following general procedure:

To a pressure reactor are charged vinyl acetate, aromatic solvent and part of the dialkyl maleate. After purging with nitrogen, 1–3% benzoyl peroxide (based on combined monomer weight) is added and the polymerization started by heating to 50°–55° C. An exotherm carries the reaction to 70°–75° C. After 6–8 hours at this temperature additional dialkyl maleate is added according to a special co-monomer addition scheme in order to prepare copolymers with the desired composition.

Normally the polymer solutions obtained from this procedure were moderately viscous, nicely fluid products with a polymer content of 40–60%. To those familiar with the art of vinyl copolymerization and the concept of copolymerization parameters, it will be clear that the desired random copolymer composition could not in all cases directly be customized by choosing that same ratio in the monomer mixture. It sometimes became necessary to devise special co-monomer addition schemes to prepare copolymers with the desired composition. In other instances fractionation of polymer batches resulted in samples with a well defined much narrower co-monomer ratio.

Special emphasis was placed on the synthesis of the commercially most attractive copolymers, namely those based on vinyl acetate (as the "hydrophilic" monomer) and di-(2-ethylhexyl) maleate (as the "hydrophobic" monomer). Altogether several hundred copolymers were prepared and subsequently evaluated for demulsification activity.

These copolymers were evaluated by the method generally referred to as the "Bottle Test" described in "Treating Oil Field Emulsions" second edition, issued by Petroleum Extension Service and the Texas Education Agency in cooperation with the American Petroleum Institute, 1955, (revised 1962) pages 39–44. These evaluations were carried out at wells at various locations. A cross section of many of these is listed below:

TABLE VI

| Field | Location |
|---|---|
| Huntington Beach | California |
| Heidelberg | Mississipi |
| Elk Basin | Wyoming |
| Thompsons | Texas |
| Three Hills | Canada |
| Port Barre | Louisiana |
| Dixie Pool | Oklahoma |
| Sand Flats | Texas |
| Baxterville | Mississippi |
| Tyler | Texas |
| Oregon Basin | Wyoming |
| Notrees | Texas |
| Stafford | Kansas |
| Twining | Canada |
| Fruitvale | California |

It should be understood that specific responses by a particular crude to a specific composition, as determined by this bottle test will vary widely due to the great variety in the nature, composition, character, production method, temperature, etc., etc. of the crude oil in question and the specific interpolymer under evaluation. In order to establish a reliable method to evaluate the relative performance of these interpolymers compared to the activity of commercially available demulsifying agents, as used at different locations, an average overall performance rating was devised as follows:

| | |
|---|---|
| no, or very little, activity | 0 |
| little activity | P (poor) |
| substantial activity | F (fair) } indicating good commercially significant activity. |
| excellent activity | G (good) |

In this rating scheme the field standard, the commercial material actually in use at the particular location is given a G rating, while all experimental materials are judged relatively to this standard.

The following Table VII describes a cross section of copolymers prepared and evaluated during the course of this invention, (the following abbreviations were used:)

VA = Vinyl acetate
DBM = Dibutyl maleate
DDM = Didecyl maleate
DEHM = Di(2-ethylhexyl) maleate
DDOM = Didodecyl maleate
$DA_{1218}M$ = Di("Alfol"-1218) maleate
DODM = Dioctadecyl maleate
DMM = Dimethyl maleate

TABLE VII

| Example | Copolymer | Mole Ratio | C/O Ratio | Average Performance Rating | Remarks |
|---|---|---|---|---|---|
| 60 | VA/DBM | 95/5 | 2.09 | 0 | As made |
| 61 | | 90/10 | 2.18 | P | " |
| 62 | | 80/20 | 2.33 | 0 | " |
| 63 | | 65/35 | 2.52 | 0 | " |
| 64 | | 50/50 | 2.66 | 0 | " |
| 65 | VA/DDM | 95/5 | 2.38 | F | " |
| 66 | | 92.5/7.5 | 2.55 | G | " |
| 67 | | 90/10 | 2.72 | F | " |
| 68 | | 87.5/12.5 | 2.88 | P | " |
| 69 | | 85/15 | 3.04 | P | " |
| 70 | | 82.5/17.5 | 3.19 | P | " |
| 71 | | 80/20 | 3.33 | P | " |
| 72 | VA/DEHM | 95/5 | 2.28 | F | " |
| 73 | | 90/10 | 2.55 | G | " |
| 74 | | 80/20 | 3.0 | G | " |
| 75 | | 65/35 | 3.55 | P | " |
| 76 | | 50/50 | 4 | 0 | " |
| 77* | VA/DEHM | 98/2 | 2.11 | 0 | Isolated fractions |
| 78 | | 95/5 | 2.28 | 0 | Isolated fractions |
| 79 | | 93/7 | 2.39 | P | Isolated fractions |
| 80 | | 90/10 | 2.55 | F | Isolated fractions |
| 81 | | 87/13 | 2.69 | F | Isolated fractions |
| 82 | | 83/7 | 2.87 | G | Isolated fractions |
| 83 | | 79/21 | 3.04 | G | Isolated fractions |
| 84 | | 74/26 | 3.23 | F | Isolated fractions |
| 85 | | 70/30 | 3.38 | F | Isolated fractions |
| 86* | | 60/40 | 3.71 | P | Isolated fractions |
| 87 | VA/DDOM | 97.5/2.5 | 2.24 | P | As made |
| 88 | | 95/5 | 2.47 | F | " |
| 89 | | 92.5/7.5 | 2.69 | P | " |
| 90 | | 90/10 | 2.90 | P | " |
| 91 | | 87.5/12.5 | 3.11 | P | " |
| 92 | | 85/15 | 3.30 | P | " |
| 93 | VA/DA$_{1218}$M | 98/2 | 2.10 | 0 | " |
| 94 | | 97/3 | 2.16 | P | " |
| 95 | | 96/4 | 2.21 | F | " |
| 96 | | 95/5 | 2.26 | F | " |
| 97 | | 94/6 | 2.31 | G | " |
| 98 | | 92/8 | 2.40 | F | " |
| 99 | | 90/10 | 2.50 | P | " |
| 100 | | 87.5/12.5 | 2.61 | P | " |
| 101 | VA/DODM | 95/5 | 2.76 | P | " |
| 102 | | 92.5/7.5 | 3.11 | P | " |
| 103 | | 90/10 | 3.45 | F | " |
| 104 | | 87.5/12.5 | 3.77 | P | " |
| 105 | | 85/15 | 4.08 | 0 | As made |
| 106 | | 80/20 | 4.66 | 0 | " |
| 107 | VA/DMM | 95/5 | 1.95 | 0 | " |
| 108 | | 90/10 | 1.90 | 0 | " |
| 109 | | 85/15 | 1.86 | 0 | " |
| 110 | | 75/25 | 1.80 | 0 | " |
| 111 | | 65/35 | 1.74 | 0 | " |
| 112 | | 50/50 | 1.66 | 0 | " |

*Examples 77 through 86 contain copolymer fractions from Example 74 (mole ratio 80/20) to yield narrower compositions with the mole ratio shown.

Although specific interpolymers may end up with a low average overall rating (o,p) in the above table, such products may well score high at another particular location, or vice versa, as can be seen from the specific examples that follow.

It is also often observed that specific types of materials perform exceptionally well in one particular phase of the demulsification process, although blending with components contributing complementary activity is required to form a "complete" compound. So these "single component" copolymers for this reason may score less than the field standards which are always blends of several ingredients.

The following examples of bottle tests are presented for purposes of illustration and not of limitation.

EXAMPLE 113

A crude oilfield emulsion, containing 40% water was sampled in the Heidelberg field in Mississippi. The sample was treated at 27° C. by the addition of 1% solution of chemical, to 100 ml emulsion and shaking 100 times to mix in the chemical and observing the results after quiet settling for a one hour period. The resultant top oil was then sampled at half way total liquid depth and analyzed for water content with the following results (Table VIII).

TABLE VIII

| Product of Example | ml of 1% Solution | Residual H$_2$O in Treated Oil |
|---|---|---|
| Commercial Blend A | 1.0 | 0.4% |
| In use at location | 0.3 | 1.2% |
| Commercial Blend B | 0.3 | 2.1% |
| Example Number 73 | 1.0 | 0.2% |
| Example Number 73 | 0.3 | 1.4% |
| Example Number 109 | 0.3 | 26.7% |
| Example Number 66 | 0.3 | 1.2% |

EXAMPLE 114

An emulsion sample was taken from the production in the Twining Field in Alberta, Canada. This emulsion contained 50% water. It was treated with a 1% solution of chemical per 100 ml, shaken for 200 shakes and analyzed after a quiet settling period of 45 minutes with the following results (Table IX):

TABLE IX

| Product of Example | ml of 1% Solution | Percent Residual H₂O in Oil |
|---|---|---|
| Commercial Compound In use | 1.0 | 1.1% |
|  | .5 | .8% |
| Example No. 84 | .5 | .1% |
| Example No. 62 | .5 | 7.4% |
| Example No. 97 | .5 | 1.9% |
| Example No. 112 | .5 | 39.0% |

EXAMPLE 115

A crude emulsion sample was taken from production in the Sand Flats Field in Texas. This sample contained 28% highly emulsified water. 100 ml samples of this crude emulsion were treated with 1% solutions of various demulsifiers. After quiescent settling for 90 minutes at 71° C., following 150 shakes to mix in the demulsifier, the top oil was analyzed, close to the oil water interface. Results are listed in Table X:

TABLE X

| Product of Example | ml of 1% Solution | Percentage H₂O in Oil |
|---|---|---|
| Commercial Compound In use | 1.2 | 0.6 |
|  | 0.9 | 0.9 |
| Example No. 84 | 0.9 | 2.0 |
| Example No. 82 | 0.9 | 1.0 |
| Example No. 98 | 0.9 | 1.2 |
| Example No. 64 | 0.9 | 19.0 |
| Example No. 70 | 0.9 | 4.7 |

Although in all examples given the hydrophilic monomer selected was mainly vinyl acetate, such selection was mainly a matter of convenience and the scope of this invention is much broader and is not to be limited thereby.

To illustrate the breadth of this invention, the following examples will illustrate copolymers prepared from hydrophilic monomers other than vinyl acetate, e.g., methyl methacrylate, methyl acrylate, ethyl acrylate, vinyl propionate and vinyl formate. These interpolymers are, in general, prepared by methods discussed above and well-known to those skilled in the art. In some cases (e.g. Examples 126–129) the copolymers were prepared by more elaborate procedures (e.g. polymerization of an MA.BF₃ complex with an olefin, followed by purification and fractionation).

Table XI summarizes a small cross-sectional of co- and ter-polymers prepared with hydrophilic monomers other than vinyl acetate. The materials selected for Table XI were especially chosen from those materials which showed good activity when evaluated in demulsification applications.

The following abbreviations are used in Table XI:
MMA = methyl methacrylate
MA = methyl acrylate
IBMA = isobutyl methacrylate
EA = ethyl acrylate
EHMA = 2-ethylhexyl methacrylate
StMA = stearyl methacrylate
LMA = lauryl methacrylate
EHA = 2-ethylhexyl acrylate
HEMA = hydroxyethyl methacrylate
HPMA = hydroxypropyl methacrylate
$C_6O$ = $C_6$-α olefin (hexene)
$C_{14}O$ = $C_{14}$-α olefin (tetradecene)
$C_{20}O$ = $C_{20}$-α olefin (eicosene)
VP = vinyl propionate
VF = vinyl formate
DEHM = di(2-ethylhexyl)maleate

| Example | Co(Ter) Polymer | Mole Ratio | C/O Ratio | Average Performance Rating | Remarks |
|---|---|---|---|---|---|
| 116 | MMA/IBMA | 60/40 | 3.1 | 0 | As made |
| 117 | MMA/EHMA | 85/15 | 3.0 | 0 | " |
| 118 | MMA/StMA | 90/10 | 3.35 | P | " |
| 119 | MMA/LMA | 90/10 | 3.05 | P | " |
| 120 | MA/EHMA | 75/25 | 3.0 | P | " |
| 121 | MA/StMA | 92/8 | 2.72 | F | " |
| 122 | MA/EHA | 70/30 | 3.05 | G | " |
| 123 | MA/EHMA | 72.5/27.5 | 3.1 | G | " |
| 124 | MA/EHMA | 70/30 | 3.2 | G− | " |
| 125 | MA/EHMA | 67.5/32.5 | 3.3 | G− | " |
| 126 | MA/$C_{14}O$ | 81.8/18.2 | 3.55 | G | purified fraction |
| 127 | MA/$C_6O$ | 62.5/37.5 | 3.8 | P | purified fraction |
| 128 | MA/$C_{20}O$ | 81.8/18.2 | 4.2 | 0 | purified fraction |
| 129 | EA/$C_{14}O$ | 85.5/14.5 | 3.68 | F | purified fraction |
| 130 | VP/DEHM | 70/30 | 3.65 | 0 | As made |
| 131 | VF/VV-10 | 77.8/22.2 | 2.38 | 0 | " |
| 132 | MA/EHMA | 67.5/32.5 | 3.3 | F | " |
| 133 | VA/HEMA/DEHM | 68/3/29 | 3.33 | G | " |
| 134 | VA/HPMA/DEHM | 63.6/9/27.4 | 3.24 | G | " |
| 135 | MA/HEMA/EHMA | 66.7/4.8/28.5 | 3.11 | F | " |
| 136 | VA/HEMA/DEHM | 60.8/13.1/26.1 | 3.18 | F | " |
| 137 | MA/EHMA | 65/35 | 3.4 | F | " |
| 138 | MA/EHMA | 90/10 | 2.4 | P | " |
| 139 | MA/HEMA/EHMA | 66.6/4.8/28.6 | 3.11 | F | " |

It will be apparent to those skilled in the art from the above description and examples that the demulsification process of this invention can be carried out with numerous interpolymers as defined and especially with the preferred embodiment, i.e., the interpolymers derived from at least one hydrophilic monomer and at least one hydrophobic monomer including a dialkyl maleate.

In lieu of a list of several thousand monomer combinations which fall within the scope of the invention, it should suffice to note that those skilled in the art of vinyl polymerization, and in view of the teachings herein, have sufficient guidelines to make and use demulsifiers within the scope of the parameters defined and exemplified above.

Although amply illustrated above, the most highly preferred hydrophilic monomers used to prepare the demulsifiers illustrated are vinyl acetate, vinyl formate, vinyl propionate, methyl acrylate, methyl methacrylate, dimethyl maleate and methyl vinyl ether. The most highly preferred hydrophobic monomers are the vinyl esters of "Versatic-10" acid, vinyl isobutyrate, vinyl n-decanoate, vinyl stearate, isobutyl methacrylate, 2-ethylhexyl methacrylate, stearyl methacrylate, lauryl methacrylate, 2-ethylhexyl acrylate, tetradecene, hexene, eicosene, di(2-ethylhexyl)maleate, dibutyl maleate, didodecyl maleate, didecyl maleate and di("Alfol"-1218) maleate.

The foregoing examples represent a cross-section of a far larger group of vinyl-type copolymers that were thoroughly evaluated. No demulsifier activity was observed for compositions outside the claimed compositions. In those cases where apparent activity originally seemed present outside the approximately 2–4 C/O range, further purification and fractionation of the initially obtained crude copolymer led to the final identification of the active fraction as the one with a composition within the claimed composition. To those familiar with the art of vinyl copolymerization and the concept of copolymerization parameters, it will be clear that the desired copolymer compositions can not always be directly obtained from the original ratio as present in the monomer mixture. It is often necessary to devise a special monomer addition scheme to prepare a copolymer with the desired composition.

While we have shown and described various embodiments in accordance with the present invention which has described interpolymers and their use in the demulsification of emulsions, it is understood that the same is not limited thereto but is susceptible of various changes and modifications. For example, in addition to copolymers, ter- and higher polymers can also be employed. In addition, the interpolymers may also contain other elements besides carbon, hydrogen and oxygen, provided such elements do not interfere with their function in this invention.

We claim:

1. A process which comprises demulsifying a water-in-oil emulsion with an effective demulsifying amount of an aliphatic vinyl-type interpolymer having an overall C/O atom ratio of between about 2 and about 4, said interpolymer being water insoluble and oil soluble at room temperature and having been prepared from about 50 to about 99 mole percent of at least one hydrophilic vinyl monomer having a C/O ratio of about 3 or less and correspondingly from about 50 to about 1 mole percent of at least one hydrophobic vinyl monomer containing only aliphatic carbon atoms or which is represented by the formula $$C_pH_{2p-2}O_2$$

wherein p represents a number equal to or greater than 6.

2. Process of claim 1 wherein the mole percent ratio of hydrophilic to hydrophobic monomer is from about 50/50 to about 95/5.

3. Process of claim 1 wherein the mole percent ratio of hydrophilic to hydrophobic monomer is from about 75/25 to about 90/10.

4. Process of claim 1 wherein the mole percent ratio of hydrophilic to hydrophobic monomer is from about 80/20 to about 90/10.

5. Process of claim 1 wherein said hydrophilic monomer is vinyl formate.

6. Process of claim 1 wherein said hydrophilic monomer is vinyl acetate.

7. Process of claim 1 wherein said hydrophilic monomer is vinyl propionate.

8. Process of claim 1 wherein said hydrophilic monomer is methyl acrylate.

9. Process of claim 1 wherein said hydrophilic monomer is methyl methacrylate.

10. Process of claim 1 wherein said hydrophilic monomer is ethyl methacrylate.

11. Process of claim 1 wherein said hydrophilic monomer is dimethyl maleate.

12. Process of claim 1 wherein said hydrophilic monomer is methyl vinylether.

13. Process of claim 1 wherein said hydrophilic monomer is a vinyl fatty acid ester.

14. Process of claim 13 wherein said vinyl fatty acid ester is a dialkyl maleate other than dimethyl maleate.

15. Process of claim 14 wherein said maleate is dibutyl maleate.

16. Process of claim 14 wherein said maleate is di-2-ethylhexyl maleate.

17. Process of claim 14 wherein said maleate is didecyl maleate.

18. Process of claim 14 wherein said maleate is dioctadecyl maleate.

19. Process of claim 14 wherein said maleate is diodecyl maleate.

20. Process of claim 1 wherein said hydrophobic monomer is selected from the group consisting of vinyl stearate, dodecyl acrylate, butyl methacrylate, dioctyl maleate, 1-octene, 1-dodecene and dodecyl vinyl ether.

21. Process of claim 1 wherein said hydrophobic monomer is selected from the group consisting of vinyl hexanoate, vinyl octanoate, vinyl decanoate, vinyl stearate, di(stearyl) maleate, vinyl palmitate and vinyl laurate.

22. Process of claim 1 wherein said hydrophobic monomer is selected from the group consisting of vinyl tertiary decanoate, vinyl isobutyrate, vinyl n-decanoate, vinyl stearate, isobutyl methacrylate, 2-ethylhexyl methacrylate, stearyl methacrylate, lauryl methacrylate, 2-ethylhexyl acrylate, tetradecene, hexene, eicosene, di-2-ethylhexyl maleate, dibutyl maleate, didodecyl maleate and didecyl maleate.

23. Process of claim 1 wherein said hydrophilic monomer is vinyl acetate and said hydrophobic monomer is vinyl tertiary decanoate.

24. Process of claim 1 wherein said hydrophilic monomer is vinyl acetate and said hydrophobic monomer is vinyl isobutyrate.

25. Process of claim 1 wherein said interpolymer is a terpolymer prepared from vinyl acetate hydrophilic monomer and hydroxyethyl methacrylate and di(2-ethylhexyl)methacrylate as hydrophobic monomers.

26. Process of claim 1 wherein said interpolymer is a terpolymer prepared from vinyl acetate as hydrophilic monomer and hydroxypropyl methacrylate and di(2-ethylhexyl)methacrylate as hydrophobic monomers.

27. Process of claim 1 wherein said interpolymer is a terpolymer prepared from methyl acrylate as hydrophilic monomer and hydroxyethyl methacrylate and di(2-ethylhexyl)methacrylate as hydrophobic monomers.

* * * * *